3,411,558
METHODS AND APPARATUS FOR PREPARING A HOMOGENEOUS MASH OF ROOT-CROPS
Nils R. M. Weibull, Malmo, Sweden, assignor to Ingeniorsfirman Nils Weibull AB, Malmo, Sweden
Filed Oct. 31, 1966, Ser. No. 590,686
5 Claims. (Cl. 146—225)

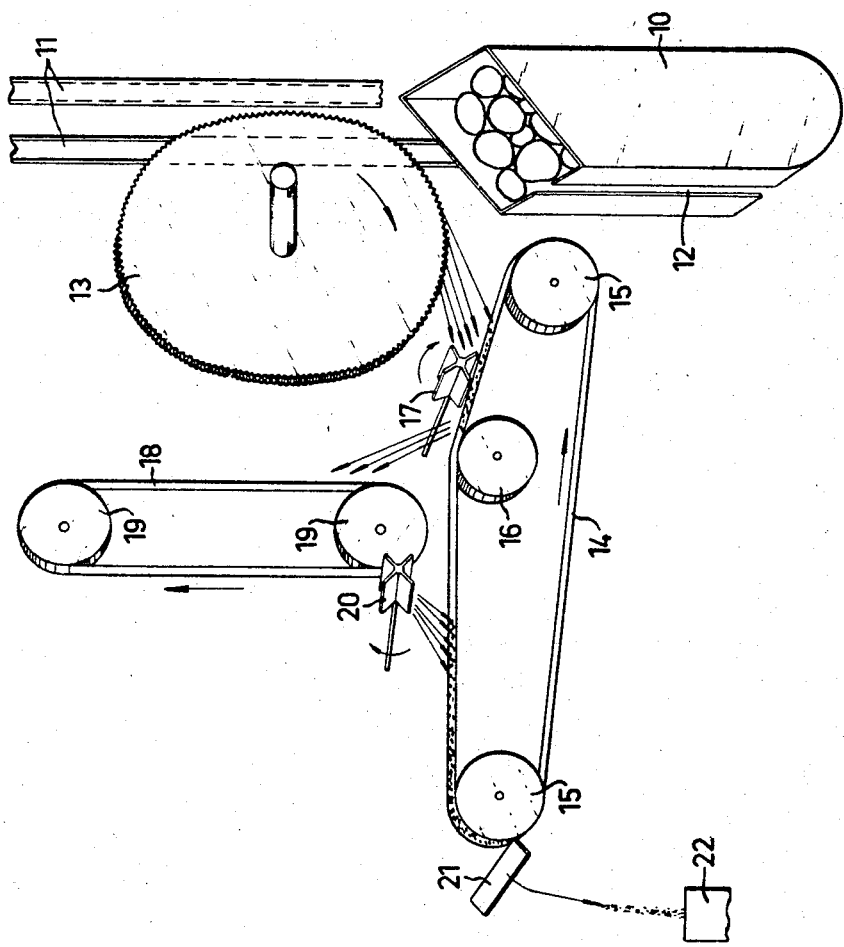

This invention relates to a method and an apparatus for preparing a homogeneous mash of root-crops and like products and has been developed particularly for the sampling carried out on every beet load delivered to the sugar factories for the purpose of determining the sugar content of the delivered beets, which is one of the basic factors for the calculation of the payment that the manufacturer has to make for the beets. In such sampling a small quantity of beets is withdrawn from the beet load in such a way that it will as far as possible be representative for the beet load in its entirety. However, this quantity which amounts to 30 to 70 kg. is too large to permit being used in its entirety for determining the sugar content in the laboratory, for which only about 80 g. of mashed beets are required. For this reason there must be prepared from the beets a small amount of mash which is of homogeneous composition and is representative for the sampled beet quantity in its entirety and thus for the beet load as such.

The method suggested by the present invention of preparing a homogeneous mash of root-crops, suited for laboratory use, comprises cutting a limited volume of root-crops—where sugar beets are concerned the quantity of beets taken as a sample of each beet load—while particles are torn from the root-crops and thrown against a moving surface to deposit thereon as a mash, throwing the mash from said surface against a second moving surface to deposit thereon, and possibly after further throwing from moving surfaces and being deposited thereon a desired number of times, wiping off and collecting the mash for the desired use. Each time it is transferred from one surface to the other the mash is subjected to mixing and homogenization.

The present invention also suggests an apparatus for practising the above method. Such apparatus comprises at least one saw blade and one container having a slotted wall for receiving the saw blade therein, said saw blade and said container being relatively movable with the saw blade passing through the container for cutting the root-crops therein, a belt conveyor arranged in connection with the saw blade for collecting the root-crop particles torn loose in the cutting operation, a rotor associated with said belt conveyor for throwing the particles deposited as a mash on the conveyor in a jet against another conveyor to deposit the mash thereon, and means for wiping off and collecting the mash deposited on the last-mentioned conveyor.

For further elucidation the invention will be described more in detail in the following with reference to the accompanying drawing which illustrates a diagrammatic embodiment of such an apparatus.

The apparatus illustrated comprises a container 10 for the root-crops or like products to be examined. Said container engages vertical stationary guides 11 on the outside of two opposite walls thereof to be guided for movement along said guides. Vertical grooves or channels may be arranged on said walls receiving said guides, or ribs may be secured to said walls to be received in the guides if provided by channels. The container has a slot 12 in a wall extending between said walls to permit a circular saw blade 13 mounted by stationary bearings in fixed relation to said guides 11 and being rotated by a motor coupled to the shaft thereof in the sense marked by an arrow to pass through the interior of the container while the container is moved on the guides 11 relative to the saw blade and to cut through the root-crops in said container. To collect the root-crop particles torn loose by the saw blade in the cutting operation a substantially horizontal conveyor belt 14 is disposed beneath the saw blade, said conveyor belt passing over return pulleys 15 and a supporting pulley 16, said pulleys being mounted in stationary bearings, and being driven in the direction marked by an arrow by a motor coupled to one of the pulleys 15. The beet particles deposit in the shape of a strand of beet mash on the upper carrying run of the conveyor belt 14 between the right-hand return pulley 15 and the supporting pulley 16. A rotor 17 in the form of a vane wheel is rotatably mounted in stationary bearings adjacent the conveyor belt and is rapidly rotated by a motor coupled to said wheel, in the direction marked by an arrow. The rotor 17 throws the mash away from the conveyor belt 14 in a jet onto another conveyor belt 18 which is substantially vertical and passes over a pair of upper and lower return pulleys 19 mounted in stationary bearings, the mash depositing in a strand on the right-hand side of the conveyor belt 18 which is driven by a motor coupled to one of the pulleys 19 in the direction marked by an arrow. Adjacent the conveyor belt 18 there is rotatably mounted in stationary bearings a further rotor 20 which is in the form of a vane wheel and is rapidly rotated by a motor coupled thereto in the direction of rotation marked by an arrow, throwing the mash from the conveyor 18 on the left-hand side thereof in a jet against the conveyor belt 14 where the mash now again is received by the upper carrying run between the left-hand return pulley 15 and the supporting pulley 16 where the conveyor belt 14 is substantially free from mash because this mash has been removed from the conveyor belt by the rotor 17. The strand of mash thus depositing on the conveyor belt 14 is wiped off it by means of a doctor blade 21 mounted by a stationary support, to be collected in a container 22.

The mash first deposited on the conveyor belt 14 from the saw blade 12 is nowise homogeneous, since it is possible to discern in the strand of mash thus deposited areas deriving from separate root-crops or root-crop layers, but the mash later wiped off the conveyor belt 14 by the doctor blade 21 is homogeneous because it has been homogenized and mixed by having been repeatedly thrown from one conveyor to the other. As a rule a greater quantity of mash is prepared than what is needed for laboratory purposes, but due to the homogenization each part quantity of the mash is representative for the mash in its entirety.

The illustrated embodiment of the apparatus according to the invention of course permits of modification with or without subsequent modification of the method practised in the apparatus. Thus several circular saw blades can be used, and the circular saw blade or blades can be replaced by band saw blades or other tearing means. The relative movement between the saw blade and the container can be realized by causing the saw blade and the associated conveyor belts to move in relation to the container which is stationary, and the mash can of course be thrown more than twice from one conveyor belt to another conveyor belt. Thus the invention must not be considered limited to the embodiment of the inventive apparatus described above and shown in the drawing nor to the version of the inventive method practised in said apparatus, but can be modified within the scope of the appended claims.

Motors and stationary bearings for the driving and mounting of the saw blade, the several pulleys and the vane wheels have not been shown in the drawing as it is obvious to one skilled in the art how such motors and bearings could be arranged.

What I claim and desire to secure by Letters Patent is:

1. A method of preparing a homogeneous mash of root-crops, which is suited for laboratory use, comprising cutting a limited volume of root-crops, particles thereby being torn from the root-crops, thrown said particles against a moving surface to deposit such particles thereon as a mash, throwing said mash from said moving surface against a second moving surface to deposit said mash thereon, and wiping off and collecting the mash for the desired use.

2. A method as claimed in claim 1, wherein said mash is thrown from moving surfaces and is deposited on moving surfaces a number of times before it is wiped off and is collected for the desired use.

3. An apparatus for preparing a homogeneous mash of root-crops, comprising at least one saw blade, a container having a wall forming a slot to receive said saw blade therein, said container and said saw blade being relatively movable, said slot allowing said saw blade to traverse the interior of said container by such relative movement to cut root-crops contained in said container, a first belt conveyor for collecting root-crop particles torn loose by said saw blade when cutting through the root-crops contained in said container, and thrown out therefrom, a second belt conveyor, a rotor for throwing the particles deposited as a mash on said first conveyor against said second conveyor, and means for removing from said second conveyor the mash deposited thereon.

4. An apparatus as claimed in claim 3, wherein said means include a rotor for throwing the mash deposited on said second conveyor in a jet onto a part of said first conveyor which is substantially free from mash and for depositing the mash again on said first conveyor, and a doctor blade for wiping off the mash from said first conveyor.

5. An apparatus as claimed in claim 4, wherein said first and second conveyors are disposed substantially at right angles to each other.

References Cited
UNITED STATES PATENTS

| | | | |
|---|---|---|---|
| 2,314,586 | 3/1943 | Levison | 146—225 |
| 3,207,628 | 9/1965 | Rietz et al. | 241—29 |

W. GRAYDON ABERCROMBIE, *Primary Examiner.*